F. S. ELLETT.
CLUTCH.
APPLICATION FILED MAY 25, 1911.

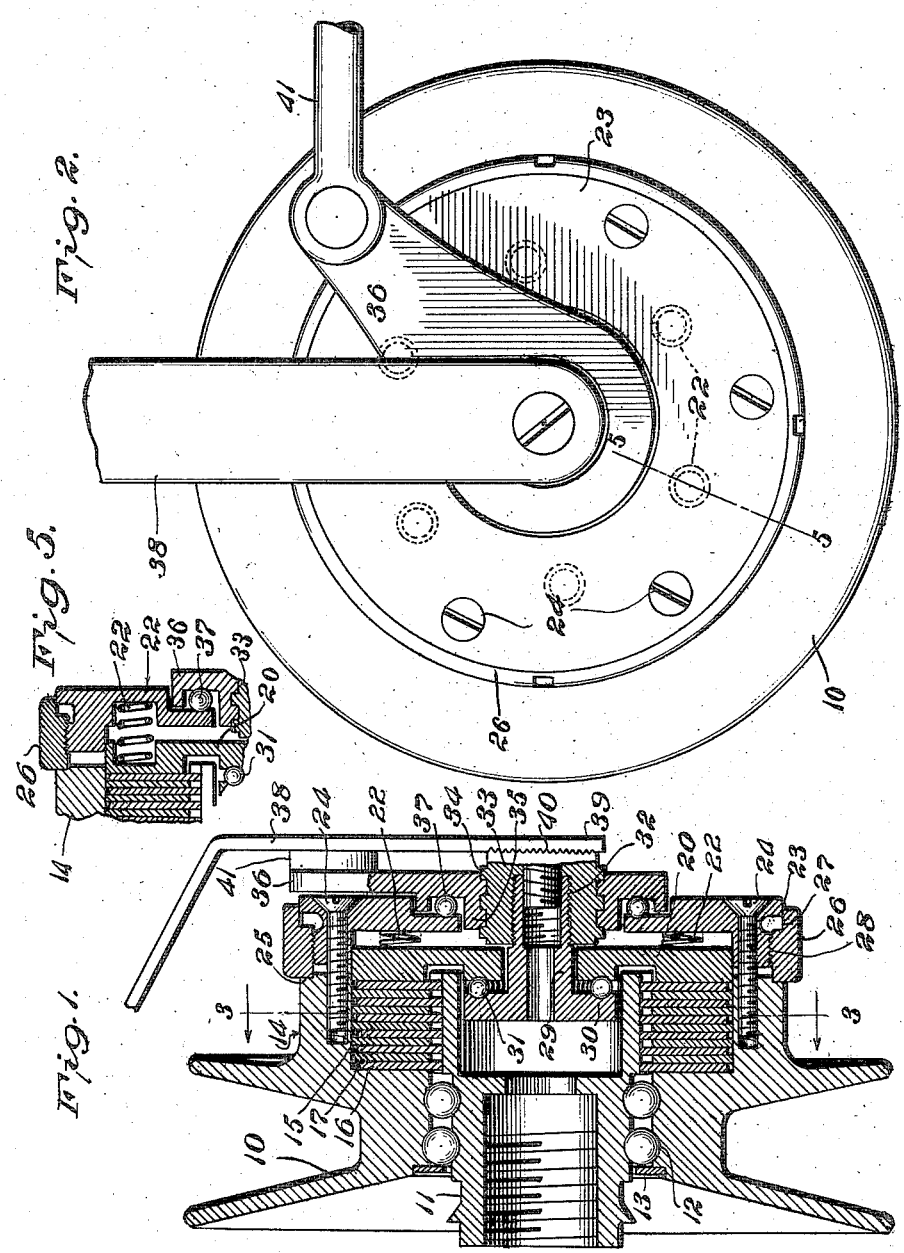

1,018,891.

Patented Feb. 27, 1912.
2 SHEETS—SHEET 2.

Witnesses
J. Adolph Bishop
B. M. Kent.

Inventor
Frederick S. Ellett
by Foster Freeman Watson & Coit
Attorneys

UNITED STATES PATENT OFFICE.

FREDERICK S. ELLETT, OF ELMIRA, NEW YORK.

CLUTCH.

1,018,891.  Specification of Letters Patent.  Patented Feb. 27, 1912.

Application filed May 25, 1911. Serial No. 629,450.

*To all whom it may concern:*

Be it known that I, FREDERICK S. ELLETT, a citizen of the United States, and resident of Elmira, in the county of Chemung and State of New York, have invented certain new and useful Improvements in Clutches, of which the following is a specification.

This invention relates to clutches and more particularly to clutches for use on motor cycles and the like whereby the driving pulley or wheel is thrown into or out of engagement with the engine or other driving shaft.

The objects of my invention are to provide a clutch which is free from endwise thrust on the shaft and which is spring-actuated and will take up the load gradually when the same is thrown on.

This invention consists generally in improvements on the clutches in my copending applications Serial Nos. 609,015 and 609,016, filed February 16, 1911.

The novel features of my invention will be apparent from the following description taken in connection with the accompanying drawings.

Figure 4:
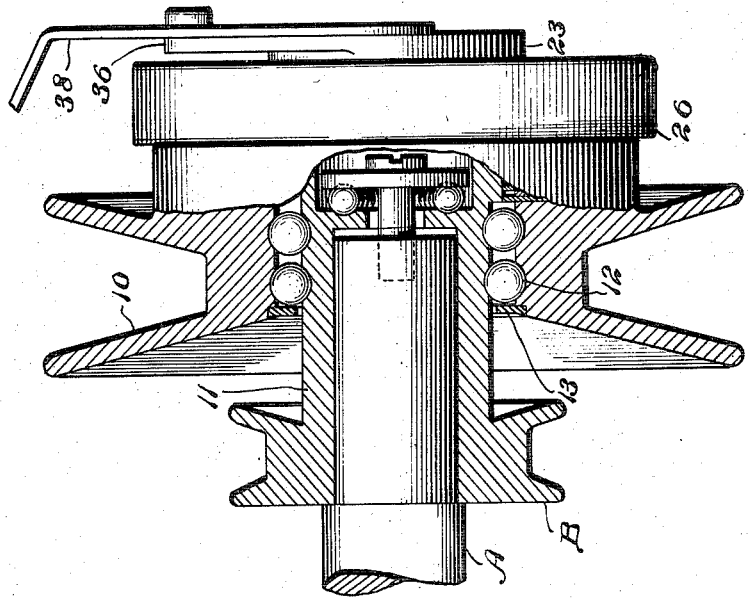
Figure 3:
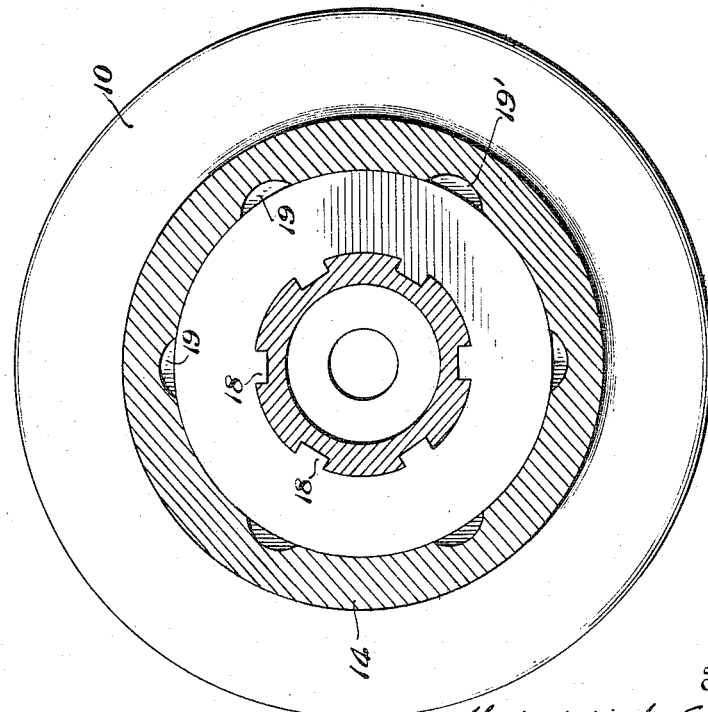

In the drawings: Figure 1 is a central longitudinal section of my invention adapted to be applied to an engine or other shaft; Fig. 2 is an exterior view of the right-hand side of Fig. 1; Fig. 3 is a transverse section on the line 3—3 of Fig. 1; Fig. 4 is a view partially in section showing my invention as applied to two pulleys mounted on a stationary axle; and Fig. 5 is a section on line 5—5 of Fig. 2.

In the drawings, 10 represents a wheel which is illustrated as a belt wheel but it will be understood that this may be a sprocket or gear wheel. The wheel 10 is mounted on a sleeve 11 by means of a ball bearing 12. As shown this ball bearing consists of two sets of balls which may be inserted in the ball races through laterally extending grooves in the wheel 10 and the sleeve 11. The balls are held in position by means of a retaining ring 13 which fits snugly in a recess in the wheel 10. The wheel 10 is provided with a collar 14 extending laterally therefrom and within this collar is a cavity 15. The cavity 15 contains two sets of annular friction disks 16 and 17, the disks 16 having radially projecting portions 18 adapted to engage grooves in the exterior surface of the inner end of the sleeve 11. The disks 17 have outwardly projecting portions 19 adapted to engage correspondingly formed recesses 19' in the collar 14. An annular plate 20 engages the outer one of the friction disks and has circumferentially arranged projections similar to the projections 19 on disks 17, and adapted to engage the recesses 19', and also has a series of recesses 21 on one side thereof adapted to receive the springs 22. An end plate 23 is fastened to the collar 14 by screws 24 and has on its inner face a series of recesses 22' which engage the springs 22. In the outer end of the collar 14 is a slight recess 25 which is engaged by one side of a ring-shaped nut 26, and on the interior of the latter is a recess 27 adapted to receive the end plate 23. The nut 26 is also provided with screw threads 28 on the interior thereof adapted to engage corresponding threads on the end plate 23 whereby the said end plate is adjustably secured to the collar 14 on the wheel 10.

Axially arranged within the plate 20 is a shaft 29 having on its inner end a flange 30, between which and the plate 20 is arranged the ball bearing 31, whereby the plate 20 is adapted to rotate relative to the shaft 29. The outer end of the shaft 29 has secured thereto by means of threads 32 a cam member 33. On the exterior of the cam member 33 are arranged steep-pitched screw threads 34 which are engaged by the threaded hub 35 of the operating lever 36. This operating lever is provided with a ball bearing 37 between its inner side and the outer side of the end plate 23 whereby the operating lever is adapted to be rotated relative to the end plate.

A fixed bracket 38 is provided at its end 39 with an opening adapted to receive the head of screw 40 which has threaded engagement with the interior of the shaft 29. On the outer end of the cam member 33 and on the adjacent face of the bracket 38 are arranged radial projections which are adapted to hold the cam member 33 in rigid engagement with the bracket 38.

In Fig. 4 is shown a modification in which the sleeve 11 is adapted to rotate on a fixed axle A, the sleeve being provided with a wheel B which may be either of the belt gear or sprocket type. In this modification the structure of the clutch is the same as shown in Fig. 1, the modification showing the clutch adapted to connect two power transmitting wheels.

The operation of the clutch is as follows: The springs 22 normally compress the disks 16 and 17 within the cavity 15 whereby the friction between these disks causes the wheel 10 to be driven by the sleeve 11 which is connected to the power shaft. When it is desired to unclutch, the lever 36 is rotated sufficiently by means of a rod 41 which has a pivotal engagement therewith, to draw the plate 20 toward the end plate 23, thereby compressing the springs 22 and relieving the pressure against the disks 16 and 17.

It should be noted that the plate 20 and the end plate 23 and the nut 26 all rotate with the wheel 10 and that the shaft 29 is held stationary by means of the bracket 38. When the lever 36 is moved to retract the plate 20 the thrust is taken up by the end plate 23 through the bearing 37 so that in releasing the clutch there is no end thrust on the power shaft. The force with which the springs 22 normally press the plate 20 against the friction disk may be changed by loosening the screws 24 and then turning the nut 26 in the desired direction to either move the end plate 23 toward the springs or away from the same. When the plate has been moved to the desired position the screws 24 are again tightened. All of the springs may thus be adjusted simultaneously.

The springs 22 are adapted to automatically compress the disks 16 and 17 when the rod 41 is released whereby the load is thrown on gradually, as the tension of the springs 22 will ordinarily be such as to permit a certain amount of slippage between the disks in starting. The clutch is also adapted to act as a variable speed drive by allowing it to run with varying amounts of slippage between the disks.

Having thus described the invention what is claimed and desired to secure by Letters Patent is:

1. A clutch comprising a rotatable sleeve, a wheel mounted on said sleeve and adapted to be rotated relative thereto, clutch members between said wheel and said sleeve, a member carried by said wheel and bearing against one of said clutch members, an end plate for said wheel, a spring connected with said member and said end plate and adapted to normally hold the clutch members in engagement, and means engaging said end plate and said member for retracting said member from said clutch members.

2. A clutch comprising a rotatable sleeve, a wheel mounted on said sleeve and adapted to be rotated relative thereto, clutch members between said wheel and said sleeve, a member carried by said wheel and bearing against one of said clutch members, an end plate for said wheel, a plurality of springs between said member and said end plate and adapted to normally hold the clutch members in engagement, and adjustable means for connecting said end plate and said wheel whereby the tension of all of said springs may be adjusted simultaneously.

3. A clutch comprising a rotatable sleeve, a wheel mounted on said sleeve and adapted to be rotated relative thereto, clutch members between the wheel and the sleeve, spring-pressed means for normally holding the clutch members in engagement and adapted to rotate with said wheel, a stationary cam engaging said spring-pressed means, and a movable cam member engaging said stationary cam member and held against bodily displacement whereby said spring-pressed means is withdrawn from said clutch members.

4. A clutch comprising a rotatable sleeve, a wheel mounted on said sleeve and adapted to be rotated relative thereto, clutch members between the wheel and the sleeve, an axially movable member adapted to rotate with said wheel and engaging said clutch members, an end plate connected with said wheel and rotatable therewith, a spring between said axially movable member and said plate and adapted to normally press said member against said clutch members, a stationary cam member engaging said axially movable member, and a movable cam member engaging said stationary cam member and adapted to retract said axially movable member and said spring.

5. A clutch comprising a rotatable sleeve, a wheel mounted on said sleeve and adapted to be rotated relative thereto, clutch members between the wheel and the sleeve, means including a spring for normally holding the clutch members in engagement, an end plate connected with said wheel and engaging said spring, and means for adjusting the end plate so as to adjust the tension of said spring.

6. A clutch comprising a rotatable sleeve, a wheel mounted on said sleeve and adapted to be rotated relative thereto, clutch members between the wheel and the sleeve, means including a spring for normally holding said clutch members in engagement, an end plate secured to said wheel and engaging said spring, and a collar engaging said wheel and having threaded engagement with said end plate whereby the position of the latter may be adjusted to vary the tension of said spring.

7. A clutch comprising a rotatable sleeve, a wheel mounted on said sleeve and adapted to be rotated relative thereto, clutch members including one or more friction disks mounted on said sleeve and rotating therewith and similar disks mounted in said wheel and alternately arranged with respect to the first-mentioned disks, means including a spring adapted to rotate with said wheel and to normally hold the clutch disks in engagement, an adjustable end plate connected with said wheel and adapted to vary the tension of said spring, an axially arranged stationary cam member having engagement at its inner end with the aforesaid means, said means being adapted to rotate relative to said cam member, a stationary arm secured to the outer end of said cam member, and a movable cam member engaging said stationary cam member and said end plate whereby the stationary cam member is moved axially and the clutch members disengaged.

8. In combination with a shaft, a sleeve rotatably mounted on one end thereof and having a wheel fixed thereon, a wheel rotatably mounted on said sleeve and carrying clutch disks, other clutch disks on said sleeve and alternately arranged between the first mentioned clutch disks, means including a spring for normally holding the clutch disks in engagement, means for varying the tension of said spring, an axially arranged stationary cam member adjacent one end of said sleeve and a movable cam member engaging the stationary cam member whereby the latter is moved axially and the clutch members disengaged.

9. The combination with a shaft, a sleeve rotatably mounted on one end thereof and having a wheel fixed thereon, a wheel rotatably mounted on said sleeve and carrying clutch disks, other clutch disks on said sleeve and alternately arranged between the first-mentioned clutch disks, a plurality of springs for normally holding the clutch disks in engagement, means for varying the tension of said springs, an axially arranged stationary cam member adjacent one end of said sleeve, and a movable cam member held against bodily displacement and engaging the stationary cam member, whereby the latter is moved axially and the clutch members disengaged.

In testimony whereof I affix my signature in presence of two witnesses.

FREDERICK S. ELLETT.

Witnesses:
A. C. RICE,
J. COSTELLO.